(12) United States Patent
Chawla et al.

(10) Patent No.: US 11,847,802 B2
(45) Date of Patent: Dec. 19, 2023

(54) SYSTEM AND METHOD FOR COMPUTING THE 3D POSITION OF A SEMANTIC LANDMARK IN IMAGES FROM THE REAL WORLD

(71) Applicant: NavInfo Europe B.V., Eindhoven (NL)

(72) Inventors: Hemang Chawla, Eindhoven (NL); Matti Jukola, Eindhoven (NL); Terence Brouns, Eindhoven (NL); Elahe Arani, Eindhoven (NL); Bahram Zonooz, Eindhoven (NL)

(73) Assignee: NavInfo Europe B.V., Eindhoven (NL)

( * ) Notice: Subject to any disclaimer, the term of this patent is extended or adjusted under 35 U.S.C. 154(b) by 278 days.

(21) Appl. No.: 17/234,444

(22) Filed: Apr. 19, 2021

(65) Prior Publication Data

US 2021/0342589 A1    Nov. 4, 2021

(30) Foreign Application Priority Data

Apr. 29, 2020 (NL) ...................................... 2025452

(51) Int. Cl.
*G06V 20/20* (2022.01)
*G06T 7/50* (2017.01)
*G06F 16/587* (2019.01)

(52) U.S. Cl.
CPC ............ *G06V 20/20* (2022.01); *G06F 16/587* (2019.01); *G06T 7/50* (2017.01)

(58) Field of Classification Search
CPC ......... G06V 20/20; G06F 16/587; G06T 7/50; G06T 2207/10016; G06T 2207/20081; G06T 2207/20084; G06T 2207/30244; G06T 2207/30252; G06T 7/80; G06T 7/97; G06T 7/73; G06T 7/246
USPC ......................................................... 382/103
See application file for complete search history.

(56) References Cited

U.S. PATENT DOCUMENTS

| | | | |
|---|---|---|---|
| 10,209,081 B2* | 2/2019 | Ghadiok | G01C 21/28 |
| 10,670,416 B2* | 6/2020 | Wheeler | G06V 10/34 |
| 10,929,713 B2* | 2/2021 | Chiu | G06T 7/162 |
| 10,949,681 B2* | 3/2021 | Herbon | H04N 23/57 |
| 11,514,588 B1* | 11/2022 | Musa | G06T 7/579 |
| 2019/0114507 A1* | 4/2019 | Chiu | G01C 21/206 |
| 2021/0004660 A1* | 1/2021 | Ambrus | G06N 3/08 |

OTHER PUBLICATIONS

Dabeer et al. "An End-to-End System for Crowdsourced 3D Maps for Autonomous Vehicles: The Mapping Component", 2017 IEEE/RSJ International Conference on Intelligent Robots and Systems {IROS) Sep. 24-28, 2017, Vancouver, BC, Canada (Year: 2017).*

(Continued)

*Primary Examiner* — Ishrat I Sherali
(74) *Attorney, Agent, or Firm* — PEACOCK LAW P.C.; Justin Muehlmeyer; Justin Jackson (57) ABSTRACT

Systems arranged to implement methods for positioning a semantic landmark in an image from the real world during a continuous motion of a monocular camera providing said image, using in combination image information from the camera and GPS information, wherein the camera parameters are unknown a priori and are estimated in a self-calibration step, wherein in a subsequent step positioning of the landmarks is completed using one of camera ego motion and depth estimation.

11 Claims, 4 Drawing Sheets

(56) References Cited

OTHER PUBLICATIONS

Schonberger et al. "Structure-from-Motion Revisited", 2016 IEEE Conference on Computer Vision and Pattern Recognition (CVPR), IEEE, Jun. 27, 2016 (Jun. 27, 2016), pp. 4104-4113, XP033021595, DOI: 10.1109/CVPR.2016.445 (Year: 2016).*
Gordon et al. "Depth from Videos in the Wild: Unsupervised Monocular Depth Learning from Unknown Cameras", 2019 IEEE/CVF International Conference on Computer Vision (ICCV) (Year: 2019).*
"How to calculate actual distance of each point from depth map #337", https://github.com/tum-vision/lsd_slam/issues/337, 2019, 1-3.
Bocquillon, Benoit, et al., "On Constant Focal Length Self-Calibration From Multiple View", 2007 IEEE Conference on Computer Vision and Pattern Recognition, 2007, 1-8.
Chen, Xiao, et al., "Integration of Low-Cost GNSS and Monocular Cameras for Simultaneous Localization and Mapping", Sensors, vol. 18, No. 2193, 2018, 2-18.
Dabeer, Onkar, et al., "An end-to-end system for crowdsourced 3D maps for autonomous vehicles: The mapping component", 2017 IEEE/RSJ International Conference on Intelligent Robots and Systems (IROS), 2017, 634-641.
Douglas, David H., et al., "Algorithms for the reduction of the number of points required to represent a digitized line or its caricature", Cartographica: the international journal for geographic information and geovisualization, vol. 10, No. 2, 1973, 112-122.
Godard, Clement, et al., "Digging Into Self-Supervised Monocular Depth Estimation", In Proceedings of the IEEE International Conference on Computer Vision, 2019, 3828-3838.
Gordon, Ariel, et al., "Depth from Videos in the Wild: Unsupervised Monocular Depth Learning from Unknown Cameras", 2019 IEEE/CVF International Conference on Computer Vision (ICCV), 2019, 8976-8985.
Lopez-Antequera, Manuel, "Deep single image camera calibration with radial distortion", In Proceedings of the IEEE Conference on Computer Vision and Pattern Recognition, 2019, 11817-11825.
Mur-Artal, Raul, et al., "ORB-SLAM: A Versatile and Accurate Monocular SLAM System", IEEE Transactions on Robotics, vol. 31, No. 5, 2015, 1147-1163.
Ramer, Urs, "An Iterative Procedure for the Polygonal Approximation of Plane Curves", Computer Graphics and Image Processing, vol. 1, 1972, 244-256.
Schonberger, Johannes L., et al., "Structure-from-Motion Revisited", 2016 IEEE Conference on Computer Vision and Pattern Recognition, 2016, 4104-4113.
Szeliski, Richard, "Computer vision: algorithms and applications", https://szeliski.org/Book/1stEdition.htm, 2010, 1-979.
Umeyama, Shinji, "Least-squares estimation of transformation parameters between two point patterns", IEEE Transactions on Pattern Analysis & Machine Intelligence, vol. 13, No. 4, 1991, 376-380.
Welzel, Andre, et al., "Accurate Camera-based Traffic Sign Localization", 7th International IEEE Conference on Intelligent Transportation Systems (ITSC), 2014, 445-450.
Zhuang, Bingbing, et al., "Degeneracy in Self-Calibration Revisited and a Deep Learning Solution for Uncalibrated SLAM", 2019 IEEE/RSJ International Conference on Intelligent Robots and Systems (IROS), 2019, 3766-3773.

\* cited by examiner

SYSTEM AND METHOD FOR COMPUTING THE 3D POSITION OF A SEMANTIC LANDMARK IN IMAGES FROM THE REAL WORLD

CROSS-REFERENCE TO RELATED APPLICATIONS

This application claims priority to Netherlands Patent Application No. 2025452, titled "System and Method for Computing the 3D Position of a Semantic Landmark in Images from the Real World", filed on Apr. 29, 2020, and the specification and claims thereof are incorporated herein by reference.

BACKGROUND OF THE INVENTION

Field of the Invention

Embodiments of the present invention relate to methods for computing the position of at least one landmark in a sequence of images from the real world captured during a continuous motion of a camera providing said images, using in combination GPS information and image information from the camera having a focal length and principal point, wherein in a subsequent step position of the at least one landmark is computed.

Embodiments of the present invention also relate to a system configured to implement such method.

Autonomous vehicles and driver assistance systems utilize maps of 3D semantic landmarks for improved decision making. However, expanding the mapping process as well as regularly updating such maps comes with a huge cost. Therefore, the ability to efficiently utilize crowd-sourced visual data carries immense potential for the domains of large-scale dynamic mapping, autonomous driving and driver assistance systems. State-of-the-art methods for crowdsourced 3D mapping assume prior knowledge of camera parameters, namely focal lengths and principal point, which are not known and may also change over time.

BRIEF SUMMARY OF THE INVENTION

Embodiments of the present invention are directed to methods and systems with the features of one or more of the appended claims.

The focal length and principal point of the camera are unknown a priori, so preferably said focal length and principal point of the camera are estimated in a self-calibration step, and further that the position of at least one semantic landmark is computed. The invention thus provides a method to estimate the 3D positions of semantically meaningful landmarks such as traffic signs using only a camera and GPS, without knowing the camera parameters such as focal lengths and principal point a priori, wherein said camera parameters are estimated in a self-calibration step, and wherein in a subsequent step the position of the at least one semantic landmark is computed using one of an estimated camera ego motion or depth estimation.

Embodiments of the present invention are also directed to a method and system wherein the camera is a monocular camera.

Embodiments of the present invention also apply where the semantic label for the landmark is from a pre-defined class or set of classes.

Embodiments of the present invention enable computing positions of 3D traffic signs in an automotive context using GPS and (monocular) cameras with unknown calibration parameters, increasing the overall map coverage with a synergistic application of multi-view-geometry and unsupervised deep learning methods.

Suitably the self-calibration step of the camera pertains to deriving the camera's focal length and principal point utilizing incremental reconstruction with bundle adjustment as applied to a subset of the sequence of images taken during the continuous motion of the camera.

It is preferred to select the subset of the sequence of images from images taken during a turn or turns in the continuous motion of the camera.

In another aspect the self-calibration step of the camera pertains to deriving the camera focal length and principal point utilizing an unsupervised deep learning technique on a subset of the sequence of images taken during the continuous motion, applying differentiable warping to image frames and comparing with adjacent image frames, to predict the camera focal length and principal point per consecutive image pair, and computing a median value of all such predictions and provide such median value as an estimate for the camera focal length and principal point.

It is beneficial to apply said deep learning technique particularly with reference to the subset of the sequence of images selected from images that are taken when turns in the continuous motion are absent.

Preferably estimating the camera ego motion is executed by using a Simultaneous Localization and Mapping (SLAM) technique, wherein best results may be achieved by arranging that the slam technique is a multi-view-geometry based monocular ORB-SLAM with loop closure.

When tracking of the camera poses in the sequence of images is successful, i.e. the SLAM approach successfully estimates the ego-motion of the camera for at least 80% of the trajectory, it is preferred that triangulation is applied to compute the position of the semantic landmark based on the self-calibrated camera parameters, the computed and scaled camera ego motion trajectory, and the coordinates of the center of the at least one landmark in the images.

When tracking of the camera poses in the sequence of images is not successful, i.e. the SLAM successfully estimates the ego-motion of the camera for less than 80% of the trajectory, it is preferred that inverse projections are applied to compute the position of the landmark based on the self-calibrated camera parameters, computed and scaled depth maps, and the coordinates of the center of the at least one landmark in the images.

To increase map coverage, it is desirable that a depth scaling factor is applied to the depth maps, wherein the depth scaling factor is derived using GPS information corresponding to camera frames adjacent to the frame for which the depth map is computed.

Suitably depth estimation and generation of a depth map per image is executed by simultaneously estimating the camera ego motion per image pair in the sequence of images.

Preferably depth estimation is applied using unsupervised deep learning with differentiable warping of image frames and comparing with adjacent frames, to generate the depth maps.

Further it is remarked that generating the depth maps involves computing camera ego-motion per image pair in the sequence of images.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

In the following, the system for 3D traffic sign positioning are described as an embodiment of the invention. The input is a sequence of n color images I=fI0; . . . ; In-1g of width w and height h, and corresponding GPS positions G=fg0; . . . ; gn-1g. The output is a list of m detected traffic signs with the corresponding class id's Ci, absolute positions $p^{abs}_i$, and the relative positions $p^{rel}_{ij}$ with respect to the corresponding frames j in which the sign was detected.

Background

In the literature, simultaneous localization and mapping (SLAM) approaches [see lit. 2, 13] were used to map the positions of point landmarks (also known as map points) in the scene while estimating the ego-motion of the vehicle, assuming known camera intrinsics. These point landmarks do not have associated semantic labels and do not provide semantically meaningful information about the 3D static environment. Furthermore, in SLAM approaches, there may not be any map points on the desired classes of semantic landmarks. Alternatively, there may be multiple map points for a single semantic landmark in the scene, and there is no obvious way to estimate a unique position of these landmarks from the map points. Approaches that did estimate the 3D positions of semantic landmarks [see lit. 3, 5], namely traffic signs, using camera and GPS, assumed that camera intrinsics were known a priori, or utilized prior information about the ground truth length, width, and height of these semantic landmarks, or additionally required the use of an inertial measurement unit (IMU). The term "semantic landmark" as used herein is generally known in the art as referring to the meaning of symbols. The term "a priori" as used herein in reference to the focal length and principle point of the camera means that, before the moment of estimating, these parameters are not known.

Figure 1:
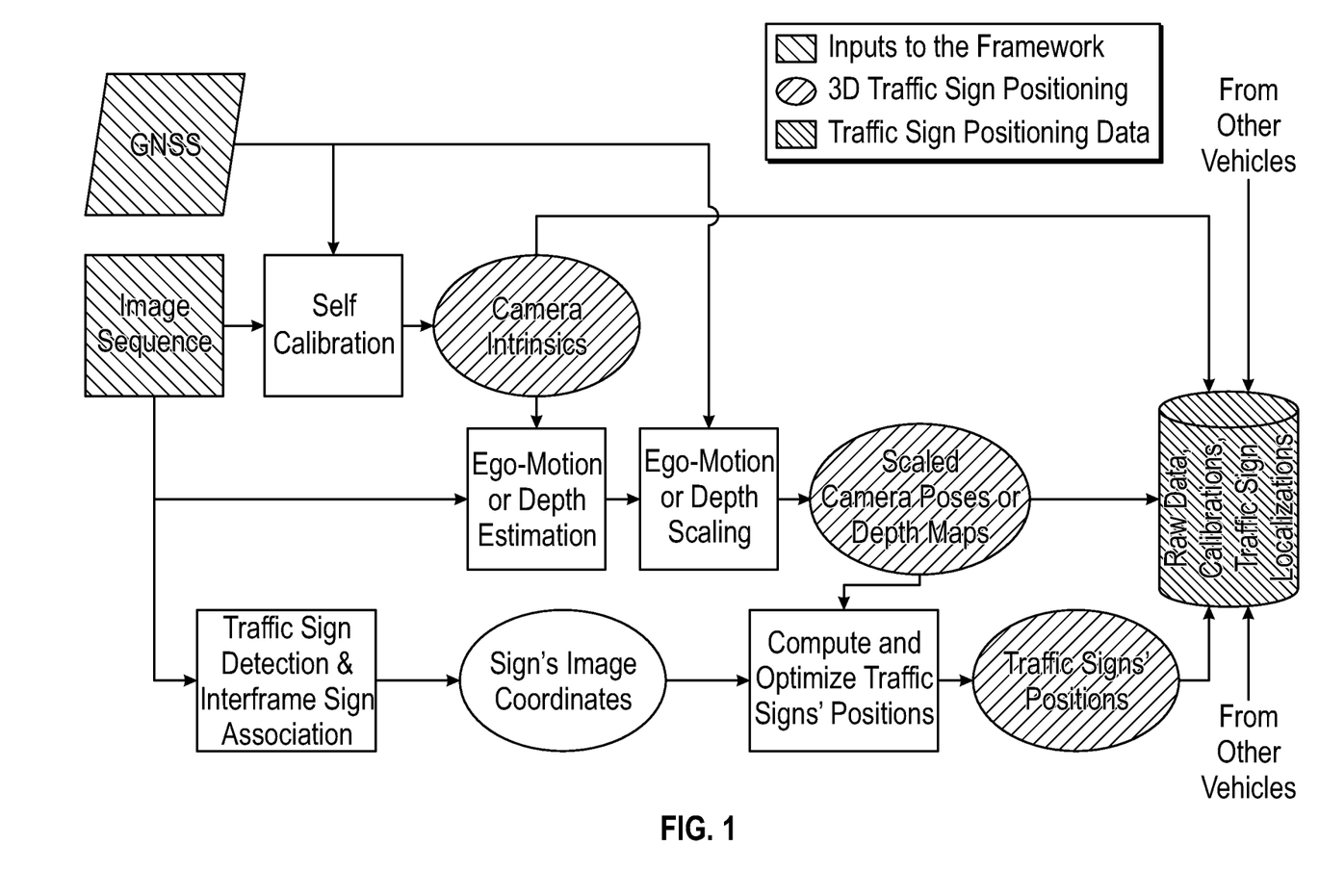
FIG. 1 depicts a Single Journey 3D Traffic Sign Positioning Framework according to an embodiment of the present invention.

An overview of the proposed method to 3D traffic sign positioning is depicted in FIG. 1. The system of the invention comprises of the following key modules:

1. Traffic Sign Detection & Inter-Frame Sign Association

The first requirement for the estimation of 3D positions of traffic signs is detecting their coordinates in the image sequence and identifying their class. The output of this step is a list of 2D bounding boxes enclosing the detected signs, and their corresponding track and frame numbers. Using the center of the bounding box the coordinates of the traffic sign in the image are extracted. However, those bounding boxes are disregarded that are detected at the edge of the images to account for possible occlusions.

2. Camera Self-Calibration

For utilizing the crowdsourced image sequences to estimate the 3D positions of traffic signs, a self-calibration for cameras is required in view of their intrinsics being unknown, and changing over time due to low-cost construction of the cameras. This is a practical limitation for the real-world crowd-sourced application and is not optional. For this, use is made of a pinhole camera model with zero skew, to determine $f_x$ and $f_y$, representing the focal lengths in x and y, and to determine the principal point ($c_x$, $c_y$).

From the set of geometry-based approaches the invention uses a Structure from Motion (SfM) based method of incremental reconstruction within bundle adjustment, preferably COLMAP™ [see lit. 12]. Note that self-calibration suffers from ambiguity for the case of forward motion with parallel optical axes [see lit 6]. Thus, COLMAP will not ordinarily succeed in self-calibration of the camera for all road scenes, especially those on straight roads. Also, directly applying COLMAP or similar SfM approach for camera self-calibration from long driving image sequences of several hours, is highly computationally expensive and time consuming. This would ordinarily conflict with the purpose of using a virtually unlimited amount of crowdsourced data for 3D mapping of semantic landmarks.

Therefore, only those parts of the sequences are used in application of COLMAP, in which the car is turning. To extract the sub-sequences in which the car is turning, the Ramer-Douglas-Peucker (RDP) algorithm [see lit. 9, 14] is preferably used to decimate the trajectory into a similar curve with fewer points, where each point represents a turn. The angle formed at these points is used as a proxy for the magnitude of the turn. The top 10 turns, selected on the basis of their magnitude, with a total of less than 1 minute of video frames (from potentially several hours of driving sequence) are then used for calibration.

In the scenario of no turns being found in the image sequences, deep learning-based methods are utilized. From the deep learning-based approaches, it is advantageous to use the Unsupervised Depth From Videos in the Wild (VITVV) [see lit. 1] which can estimate the focal lengths, and principal point for a consecutive pair of images in a sequence. Therefore, the median (m) of each parameter is computed as the final estimate. The burden of annotating training data [see lit. 7, 8] makes supervised approaches inapplicable to crowdsourced use-cases.

Note that in an ordinary scenario, application of SLAM approaches directly [see lit. 2, 13] or 3D mapping approaches that use SLAM [see lit. 3, 5] will conflict with the purpose of SfM based COLMAP [see lit. 12]. This is because both SLAM and SfM compute the position of ego-vehicle and create a structure of the environment through map points. Thus, their use together on all image frames will generally be considered redundant. Applying SfM based COLMAP, which uses all frames of the image sequence will also be contrary to the purpose of faster reconstruction of the environment from SLAM, which only uses the key-frames. Furthermore, SLAM approaches specifically utilize the sequential order of the images in the sequence, unlike the SfM approaches.

Figure 4:
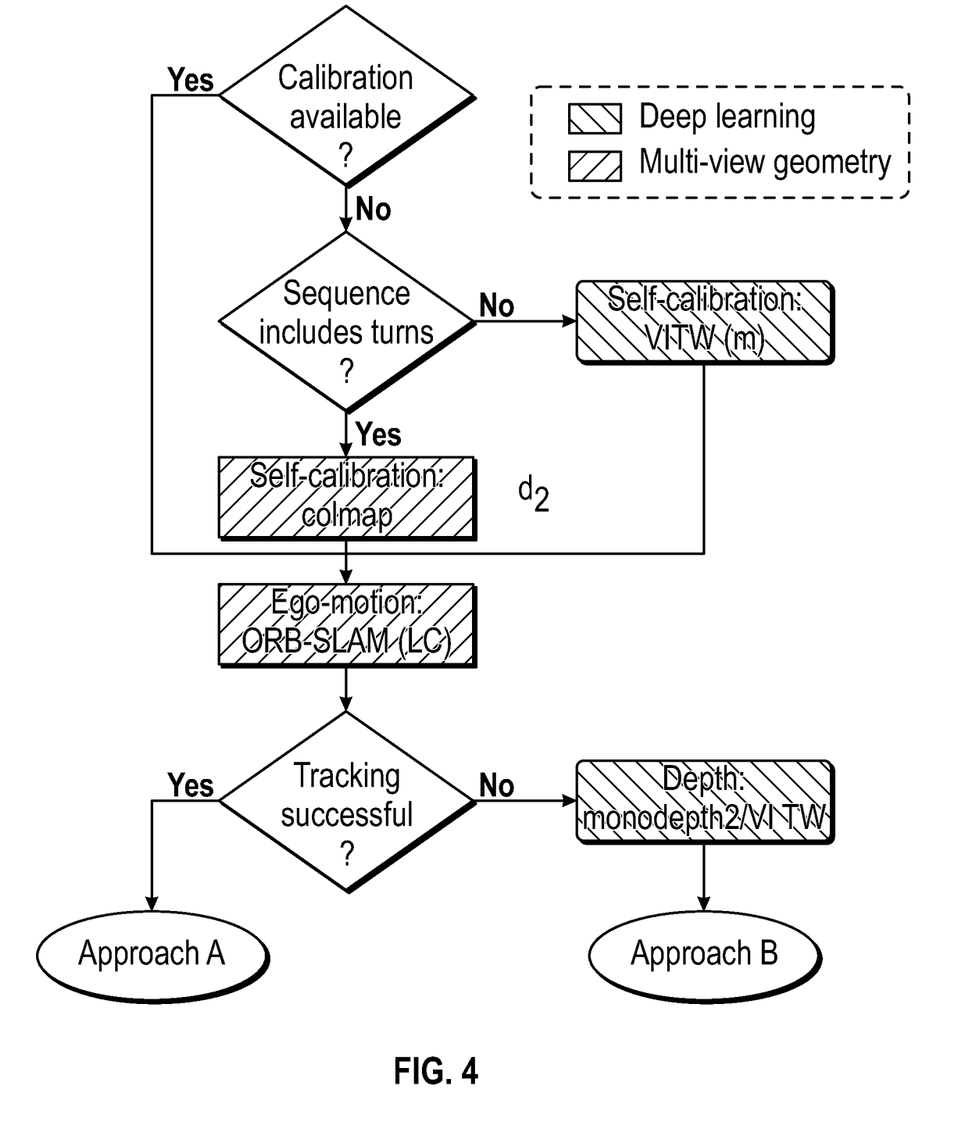
FIG. 4 depicts a condense flowchart of the 3D Traffic Sign Positioning Framework according to an embodiment the present invention.

Thus, the invention applies the configuration proposed in FIG. 4, where calibration of a subset of images is advantageously performed via SfM based COLMAP when there are turns in the image sequence, and via deep learning based VITW when they are absent. The invention provides a way to determine the small subset of complete image sequence to be used for calibration. With the proposed configuration, the success rate of self-calibration from crowdsourced driving sequences is improved while simultaneously the computation time is reduced.

3. Camera Ego-Motion and Depth Estimation

Figure 2:
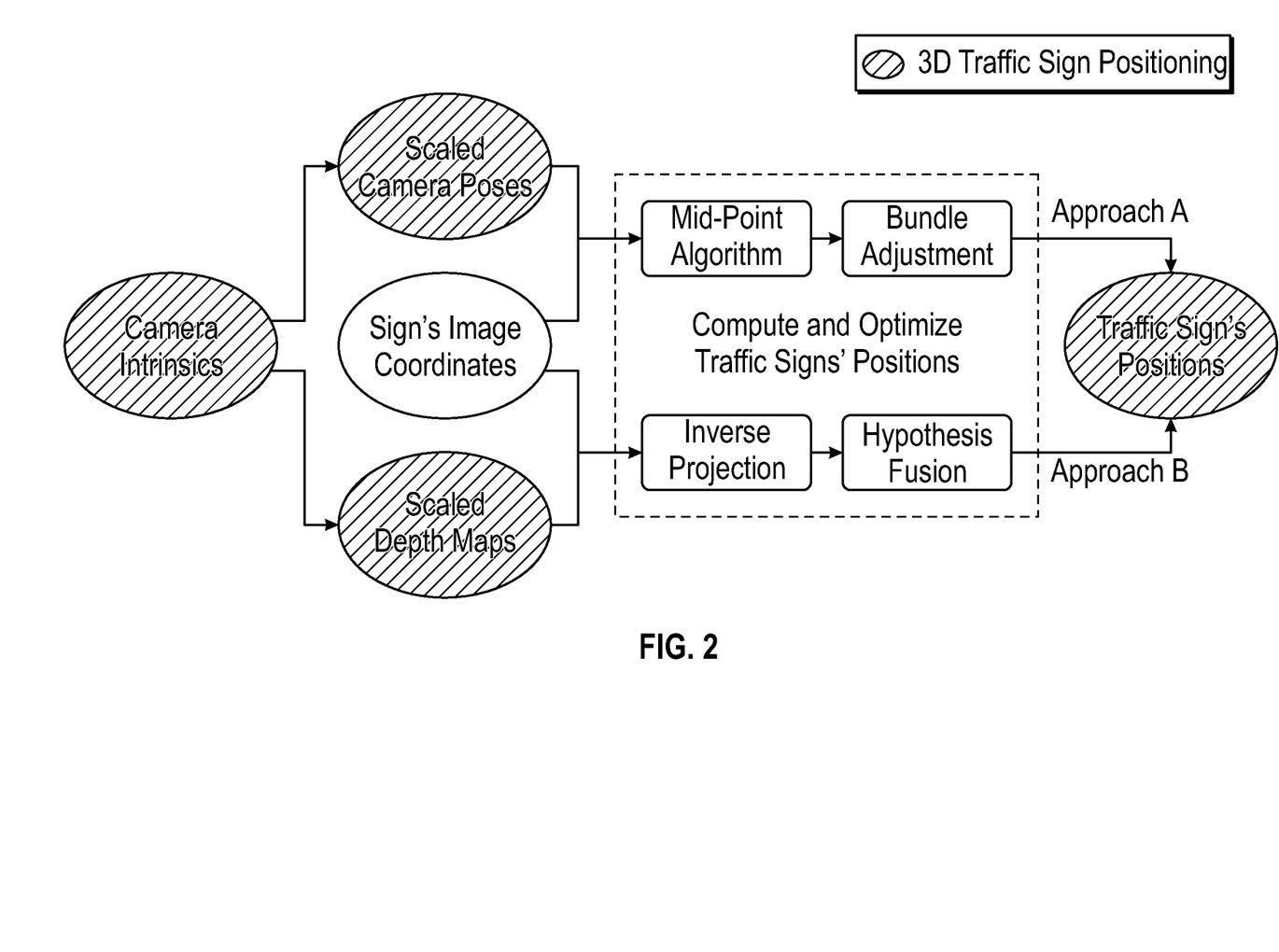
FIG. 2 depicts two approaches to estimate 3D traffic sign positions according to an embodiment of the present invention.

Given the camera calibration, the 3D traffic sign positioning requires computation of the camera ego-motion or depth as shown in FIGS. 1 and 2.

FIG. 1 depicts a Single Journey 3D Traffic Sign Positioning Framework. By reference to the legend in FIG. 1, FIG. 1 illustrates which components represent the inputs to the framework and which components represent the outputs of the three primary steps of the 3D traffic sign positioning. The crowdsourced mapping engine depicts the traffic sign positioning data coming from different vehicles.

FIG. 2 depicts two approaches to estimate 3D traffic sign positions.

Approach A uses camera intrinsics to perform ego motion estimation and generate camera poses. Approach B uses camera intrinsics to perform depth estimation and generate depth map per image. Approaches A and B utilize the camera poses and depth maps along with the traffic signs' image coordinates to compute the 3D positions of traffic signs. The modules indicated in FIG. 2 as related to 3D traffic sign position depict the primary steps from FIG. 1.

The two approaches are adopted in the configuration of FIG. 4 to increase the map coverage of semantic landmarks using the crowdsourced driving sequences. It is also necessary to use the configuration of FIG. 4, to overcome the ordinary conflict in the purpose of applying SLAM [see lit. 2, 13] and deep learning based (depth and) ego-motion estimation [see lit. 1, 4].

Approach A

Ego-Motion For applying approach A described in FIG. 2 to 3D traffic sign positioning, the ego-motion of the camera must be computed from the image sequence. Preferably state-of-the-art geometry based monocular approach ORB-SLAM with Loop Closure (LC) [see lit. 2] is applied. After performing visual ego-motion estimation, use can be made of the GPS positions to scale the estimated trajectory. Using the Umeyama's algorithm [see lit. 10], a similarity transformation, (rotation Re, translation te, and scale se) is computed that scales and aligns the estimated camera positions with the GPS positions. Thereafter, this camera trajectory is used for computation of the 3D traffic sign positions as described in section 4 hereinafter.

Approach B

Monocular Depth For applying approach B described in FIG. 2 to 3D traffic sign positioning, dense monocular depth maps are needed. To generate the depth maps, preferably the self-supervised approaches according to Monodepth 2 [see lit. 4] and VITW are used. These approaches simultaneously predict the monocular depth as well as ego-motion of the camera. The focus of the invention is on using these depth maps to compute single unique position of semantic landmark.

Depth Scaling

While the estimated dense depth maps maintain the relative depth of the observed objects, the metric depth is obtained by preserving forward and backward scale consistency. Given camera calibration matrix K, the shift in pixel coordinates due to rotation $R_{j+1,j}$ and translation $t_{j+1,j}$ between adjacent frames j and j+1, is given by $$d(c_{i+1})c_{i+1} = KR_{i+1,j}K^{-1}d(c_i)c_j + Kt_{i+1,j}$$

where $d(c_i)$ and $d(c_{j+1})$ represent the unscaled depths corresponding to the homogeneous coordinates of pixels $c_j$ and $c_{j+1}$. By multiplying the above equation with forward scale estimate $s'_{dj+1,j}$, it is seen that scaling the relative translation similarly scales the depths $d(c_i)$ and $d(c_{i+1})$.

Given relative GPS translation, the scaled relative translation is noted as $$s'_{dj+1,j} \cdot t_{j+1,j} = g_{j+1,j}$$

Therefore, the forward scale estimate is noted as $$s'_{dj+1,j} = \frac{\|g_{j+1,j}\|}{\|t_{j+1,j}\|}.$$

Similarly, the backward scale estimate $s'_{dj,j-1}$ is computed. Accordingly, for frames j=1 ... n−2, the scaling factor $s_{dj}$ is given by the average of the forward and backward scale estimates, $s'_{dj+1,j}$. Thereafter, these scaled dense depth maps are used for computation of the 3D traffic sign positions.

Figure 3:
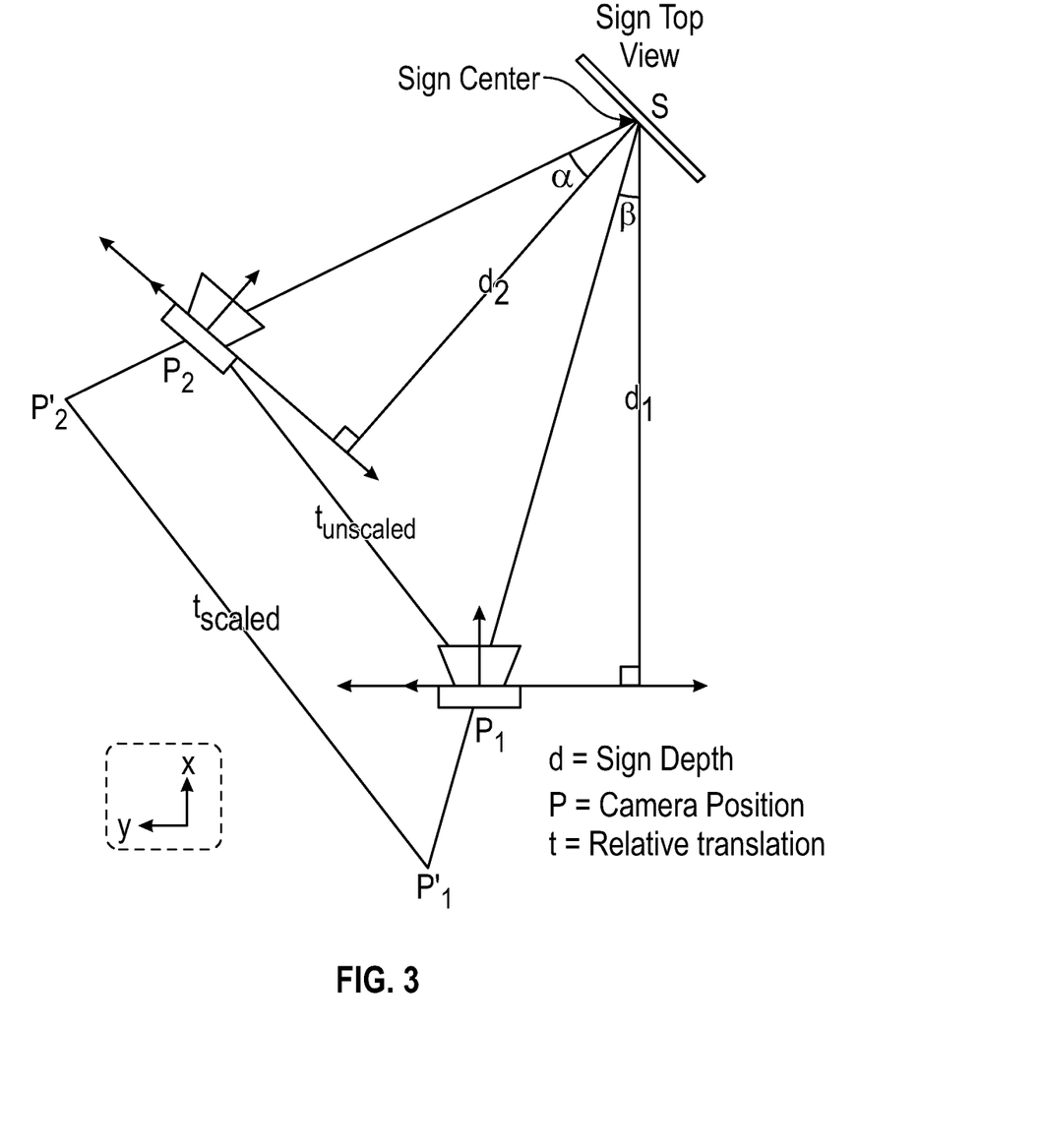
FIG. 3 depicts scaling of depth using similar triangles (top view) according to an embodiment of the present invention.

FIG. 3 shows the scaling of depth using similar triangles (top view). For any object S (e.g., traffic sign) in the scene, the depths d1 and d2 from consecutive camera positions P1 and P2 can be scaled with a common factor $s_d$. The scaling factor $s_d$ is given by the ratio of $t_{scaled}$ to $t_{unscaled}$, where t represents the relative translation between the frames.

4. 3D Positioning and Optimization

For the final step of estimating and optimizing the 3D positions of the detected traffic signs, two approaches are adopted as shown in FIG. 2 within the configuration shown in FIG. 4.

Approach A In this approach, the estimated camera focal lengths and principal point, the computed and scaled ego-motion trajectory, and the 2D positions of center of traffic signs in images are used to compute the 3D sign position through triangulation. For a sign $S_i$ observed in k frames, the initial sign position estimate $p^{init}_i$ is computed using a mid-point algorithm [see lit 11]. In this approach, the coordinates $(c_{i,j})$ of sign i in frame j are transformed to directional vectors using the camera intrinsics. Then, using linear least squares, the initial sign position is computed to minimize the distance to all directional vectors. Thereafter, non-linear Bundle Adjustment (BA) is applied to refine the initial estimate by minimizing the reprojection error.

Approach B In approach B, the estimated camera focal lengths and principal point, and the scaled dense depth maps, and the 2D positions of center of traffic signs in images are used to compute the 3D traffic sign positions through inverse projections.

For a sign $S_i$ observed in k frames, each corresponding depth map produces a sign position hypothesis given by $$p_{i,j}^{relative} = s_{dj} \cdot d(c_{i,j}) K^{-1} c_{i,j}$$

where $c_{i,j}$ represents the pixel coordinate of sign i in frame j, and $s_{d_j}$ is the corresponding depth scaling factor. Since sign depth estimation may not be reliable beyond a certain distance, we discard the sign position hypotheses whose estimated relative depth is more than 20 m. For computing the absolute coordinates of each sign, each relative sign position is projected to the world coordinates, and their centroid is computed as the absolute sign position.

SUMMARY

Using the aforementioned components, a framework combining the multi-view geometry and deep learning approaches is used as depicted in FIG. 4. This method is based on the conclusion that for self-calibration, a synergy of SfM and Deep Learning based approaches is the better choice. While COLMAP is more accurate than VITW, the former is unable to estimate the camera parameters if there are no turns present in the sequence. In such scenarios, VITW (m) is used. For estimating sign positions Approach A is usually a better choice than Approach B. Therefore, given the estimated camera parameters, ORB-SLAM with LC is used for computing ego-motion of the camera. If the tracking of the frames in sequence is successful (i.e. if the camera ego-motion is successfully computed (tracked) for at least 80% of the input frames) and a trajectory is computed, approach A is applied for computing 3D traffic sign positions. Else, the depth maps for the sequence are computed using Monodepth 2 or VITW, and sign positions are computed as part of Approach B.

The mean relative and absolute 3D traffic sign positioning errors for each validation sequence, computed using this scheme are shown in Table 1. In this validation sequence use has been made of traffic signs present in the challenging KITTI dataset, commonly used for benchmarking ego-motion, as well as depth estimation because it contains the camera calibration parameters, and synced LiDAR information that allows annotation of GT 3D traffic sign positions. Furthermore, KITTI colour cameras have low resolution, thereby representing the data quality of crowd-sourced visual sequences.

The traffic sign positions in Seq 1 use Approach B as tracking ego-motion using ORB-SLAM fails in Seq 1. For Seq 4, consisting primarily of translation on a straight road, VITW (m) is used for self-calibration. Thus, it is demonstrated that synergy of multi-view-geometry and deep learning has increased the map coverage through this invention and the application of configuration in FIG. 4. Moreover, with this approach it is possible to achieve an average relative and absolute sign positioning accuracy of 0.58 m and 1.92 m per sequence respectively from all the 10 sequences, without prior knowledge of the camera intrinsics. For all the 44 estimated signs, the relative and absolute accuracy achieved is 0.39 m and 1.68 m. The relative positioning accuracy according to the invention is comparable to [lit. 3] which unlike the framework of the invention uses camera with known intrinsics, GPS, as well as an IMU to estimate the traffic sign positions. The absolute positioning accuracy of the system according to the invention is comparable to [lit 5], which unlike the framework of the invention assumes prior knowledge of camera intrinsics as well as length, width, and height of the traffic signs.

TABLE 1

| Relative and Absolute 3D Traffic Sign Positioning Error in meters. | | | | | | | | | | | |
|---|---|---|---|---|---|---|---|---|---|---|---|
| Seq | 0 | 1 | 2 | 4 | 5 | 6 | 7 | 8 | 9 | 10 | Average |
| Rel | 0.35 | 1.09 | 0.24 | 2.1 | 0.07 | 0.48 | 0.22 | 0.82 | 0.32 | 0.10 | 0.58 |
| Abs | 0.79 | 1.56 | 0.84 | 4.62 | 0.20 | 1.19 | 0.34 | 8.14 | 0.92 | 0.60 | 1.92 |

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

REFERENCES

References cited throughout this specification are made to the following references. Discussion of such references are given for more complete background and is not to be construed as an admission that such references are prior art for patentability determination purposes.
[1] Ariel Gordon, Hanhan Li, Rico Jonschkowski, and Anelia Angelova. Depth from videos in the wild: Unsupervised monocular depth learning from unknown cameras. In The IEEE International Conference on Computer Vision (ICCV), 2019.
[2] Raul Mur-Artal, Jose Maria Martinez Montiel, and Juan D Tardos. Orb-slam: a versatile and accurate monocular slam system. IEEE transactions on robotics, 31(5):1147-1163, 2015.
[3] Onkar Dabeer, Wei Ding, Radhika Gowaiker, Slawomir K Grzechnik, Mythreya J Lakshman, Sean Lee, Gerhard Reitmayr, Arunandan Sharma, Kiran Somasundaram, Ravi Teja Sukhavasi, et al. An end-to-end system for crowdsourced 3d maps for autonomous vehicles: The mapping component. In 2017 IEEE/RSJ International Conference on Intelligent Robots and Systems (IROS), pages 634-641. IEEE, 2017.
[4] Clement Godard, Oisin Mac Aodha, Michael Firman, and Gabriel J Brostow. Digging into self-supervised monocular depth estimation. In Proceedings of the IEEE International Conference on Computer Vision, pages 3828-3838, 2019.
[5] André Welzel, Andreas Auerswald, and Gerd Wanielik. Accurate camera-based traffic sign localization. In 17th International IEEE Conference on Intelligent Transportation Systems (ITSC), pages 445-450. IEEE, 2014.
[6] Benoit Bocquillon, Adrien Bartoli, Pierre Gurdjos, and Alain Crouzil. On constant focal length self-calibration from multiple views. In 2007 IEEE Conference on Computer Vision and Pattern Recognition, pages 1-8. IEEE, 2007.
[7] Manuel Lopez, Roger Mari, Pau Gargallo, Yubin Kuang, Javier Gonzalez-Jimenez, and Gloria Haro. Deep single image camera calibration with radial distortion. In Proceedings of the IEEE Conference on Computer Vision and Pattern Recognition, pages 11817-11825, 2019.
[8] Bingbing Zhuang, Quoc-Huy Tran, Pan Ji, Gim Hee Lee, Loong Fah Cheong, and Manmohan Krishna Chandraker. Degeneracy in self-calibration revisited and a deep learning solution for uncalibrated slam. 2019 IEEE/RSJ International Conference on Intelligent Robots and Systems (IROS), pages 3766-3773, 2019.
[9] David H Douglas and Thomas K Peucker. Algorithms for the reduction of the number of points required to represent a digitized line or its caricature. Cartographica: the international journal for geographic information and geovisualization, 10(2):112-122, 1973.
[10] Shinji Umeyama. Least-squares estimation of transformation parameters between two point patterns. IEEE Transactions on Pattern Analysis & Machine Intelligence, pages 376-380, 1991.
[11] Richard Szeliski. Computer vision: algorithms and applications. Springer Science & Business Media, 2010.
[12] Schonberger, Johannes L., and Jan-Michael Frahm. Structure-from-motion revisited. Proceedings of the IEEE conference on computer vision and pattern recognition. 2016.
[13] Chen, Xiao, et al. Integration of low-cost gnss and monocular cameras for simultaneous localization and mapping. Sensors 18.7 (2018): 2193.
[14] U. Ramer, An iterative procedure for the polygonal approximation of plane curves. Computer Graphics and Image Processing, Vol. 1., 1972.

The invention claimed is:

1. A method for computing the position of at least one semantic landmark in a sequence of images from the real world captured during a continuous motion of a camera providing the images, using in combination GPS information and image information from the camera having a focal length and principal point, wherein a position of the at least one landmark is computed and wherein the focal length and principal point of the camera are unknown a priori, the focal length and principal point of the camera are estimated in a self-calibration step, the method comprising:

selecting a subset of a sequence of images from images taken during a turn or turns of the continuous motion of the camera;

the self-calibration step of the camera comprising deriving the camera focal length and principal point utilizing incremental reconstruction with bundle adjustment as applied to the subset of the sequence of images taken during the turn or turns in the continuous motion of the camera;

selecting the subset of the sequence of images from images that are taken when turns in the continuous motion are absent;

the self-calibration step of the camera comprising deriving the camera focal length and principal point utilizing an unsupervised deep learning technique on the subset of the sequence of images taken during the continuous motion when turns in the continuous motion are absent, the self-calibration step further comprising applying differentiable warping to image frames and comparing with adjacent image frames, to predict the camera focal length and principal point per consecutive image pair, the self-calibration step further comprising computing a median value of all such predictions and providing such the computed median value as an estimate for the camera focal length and principal point; and the position of the at least one semantic landmark, namely traffic signs, is computed by detection in the image sequence and determination of the position of the at least one semantic landmark.

2. The method according to claim 1, further comprising utilizing camera ego motion or depth estimation in computing the position of the at least one semantic landmark.

3. The method according to claim 1, further comprising pre-choosing a class or classes of the at least one semantic landmark.

4. The method according to claim 1, wherein the camera is a monocular camera.

5. The method according to claim 1, further comprising estimating a camera ego motion by using a geometry-based slam technique with loop closure.

6. The method according to claim 1, further comprising estimating ego-motion of the camera and when the ego-motion of the camera is successfully estimated for at least 80% of trajectory tracking of camera poses, applying triangulation to compute the position of the at least one semantic landmark based on the self-calibrated camera parameters, a computed and scaled camera ego motion trajectory, and the coordinates of the center of the at least one semantic landmark in the images.

7. The method according to claim 1, further comprising estimating ego-motion of the camera and when the ego-motion of the camera is successfully estimated for less than 80% of trajectory tracking of camera poses, applying inverse projections to compute the position of the at least one semantic landmark based on the self-calibrated camera parameters, computed and scaled depth maps, and the coordinates of the center of the at least one semantic landmark in the images.

8. The method according to claim 7, further comprising applying a depth scaling factor to the depth maps, wherein the depth scaling factor is derived using GPS information corresponding to camera frames adjacent to the frame for which the depth map is computed.

9. The method according to claim 7, further comprising executing depth estimation and generation of a depth map per image by simultaneously estimating the camera ego motion per image pair in the sequence of images.

10. The method according to claim 9, wherein depth estimation is applied using unsupervised deep learning with differentiable warping of image frames and comparing with adjacent frames, to generate the depth maps.

11. A non-transitory computer readable-medium that stores instructions, executable by one or more processors, to cause the one or more processors to perform operations that comprise the method of claim 1.

* * * * *